United States Patent
Barranx et al.

(10) Patent No.: US 6,453,604 B1
(45) Date of Patent: Sep. 24, 2002

(54) METHOD FOR COLLECTING PRODUCTS SECRETED BY TREES, COLLECTING BAG AND ACTIVATING PRODUCT FOR IMPLEMENTING SAID METHOD

(75) Inventors: Alain Barranx, Oeyreluy (FR); Vincent de Laporterie, Dax (FR); Bruno de la Sauzay, Dax (FR); Jean-Paul Lauilhe, St-Paul Les Dax (FR); Alain Vidal, Bordeaux (FR)

(73) Assignee: Les Derives Resiniques et Terpeniques, Dax (FR)

( * ) Notice: Subject to any disclaimer, the term of this patent is extended or adjusted under 35 U.S.C. 154(b) by 0 days.

(21) Appl. No.: 09/601,448
(22) PCT Filed: Jan. 28, 1999
(86) PCT No.: PCT/FR99/00173
§ 371 (c)(1), (2), (4) Date: Oct. 24, 2000
(87) PCT Pub. No.: WO99/39565
PCT Pub. Date: Aug. 12, 1999

(30) Foreign Application Priority Data

Feb. 3, 1998 (FR) .............................................. 98/01234

(51) Int. Cl.⁷ .............................................. A01G 23/10
(52) U.S. Cl. ....................................................... 47/10
(58) Field of Search .............................. 47/11, 12, 50; 206/525; 383/120; 30/379, 379.5; 144/24.13

(56) References Cited

U.S. PATENT DOCUMENTS

| | | | | | |
|---|---|---|---|---|---|
| 559,358 A | * | 5/1896 | Burt | ............................... | 47/50 |
| 841,039 A | * | 1/1907 | McVoy | ........................... | 47/11 |
| 858,380 A | * | 7/1907 | Gilmer | ........................... | 47/11 |
| 907,778 A | * | 12/1908 | Gilmer | ........................... | 47/11 |
| 1,321,051 A | * | 11/1919 | Kamada | ........................ | 47/11 |
| 3,178,854 A | * | 4/1965 | Barron | ........................... | 47/11 |
| 3,304,654 A | * | 2/1967 | Reynolds | ........................ | 47/50 |
| 3,601,925 A | | 8/1971 | Boiling et al. | .................. | 47/11 |
| 3,839,823 A | * | 10/1974 | Roberts | ........................ | 47/10 |
| 3,959,925 A | * | 6/1976 | Sanders | ........................ | 47/12 |
| 3,959,926 A | | 6/1976 | Sanders | ........................ | 47/12 |
| 4,291,492 A | | 9/1981 | Reynolds et al. | .............. | 47/12 |

FOREIGN PATENT DOCUMENTS

| | | |
|---|---|---|
| FR | 691 361 | 10/1930 |
| FR | 725 773 | 8/1932 |
| FR | 2 160 742 | 7/1973 |
| FR | 2 746 582 | 10/1997 |

* cited by examiner

*Primary Examiner*—Charles T. Jordan
*Assistant Examiner*—Francis T. Palo
(74) *Attorney, Agent, or Firm*—Wenderoth, Lind & Ponck, L.L.P.

(57) ABSTRACT

A method of collecting secretions from trees including making a predetermined shaped incision through the bark to the surface of the wood and applying a secretion flow activation agent to the incision. The method further includes placing a receptacle in the incision, wherein the receptacle comprises a lower outer part and a flow tube portion located at the lower outer part, and wherein a portion of the receptacle has the same shape as the predetermined shape of the incision. The method further includes fixing a collecting apparatus to the flow tube and subsequently removing the collecting apparatus from the flow tube when the collecting apparatus contains secretions from the trees. The method still further includes closing the collecting apparatus, storing it in a container, closing the container, transporting the container to a product recovery site, cleaning the closed collecting apparatuses at the product recovery site, opening the clean collecting apparatuses, and recovering the secretions from the clean collecting apparatuses.

25 Claims, 5 Drawing Sheets

METHOD FOR COLLECTING PRODUCTS SECRETED BY TREES, COLLECTING BAG AND ACTIVATING PRODUCT FOR IMPLEMENTING SAID METHOD

FIELD OF THE INVENTION

The present invention relates to the collecting of products secreted by trees and refers more particularly to improving the harvesting of pins resin, or oleoresin, produced by coniferous trees (for example: *pinus pinaster, pinus eliattii, pinus sylvestris, pinus nigra, pinus pinea, pinus palustris, pinus edulis, pinus canariensis, pinus merkusii, pinus kashya*, etc.), when their bark is cut sufficiently deeply to reach the surface of the wood.

DESCRIPTION OF RELATED ART

The outflow of such products enables the tree to protect itself against its natural enemies (insects, fungi, etc.) by producing a layer of oleoresin which dries in air by the evaporation of the volatile part which it contains, thereby forming a crust which will enable the bark to grow back again A region forms around the incision that is very rich in channels that secrete this oleoresin, especially from the top of the incision, since the outflow follows gravity.

The constituents of the oleoresin, monoterpenes and resinic acids, are of very great industrial importance in many different flourishing sectors, such as the synthesis of raw materials for perfumes, inks, adhesives and so forth.

The object of the invention is to provide a method of collecting the resin in such a way that these products can be obtained at a price that will compete with raw materials produced from petroleum without diminishing the quality of the wood of the trees.

By contrast, currently used methods harvest only some of the outflow, partly by allowing the secretory channels to become blocked and partly by allowing the volatile products, whose industrial value is very considerable, to evaporate into the air. Furthermore, the systems generally employ placing metal parts into the wood, the presence of such parts is undesirable for the wood conversion industry.

In patents FR 691,361, FR 725,773 and FR 725,774, a method is described for tapping secretions using a manual mechanical apparatus enabling the tree to be prepared in order for a "closed" oleoresin tapping system to be placed against it.

Patent FR 2,746,582 discloses a closed-vessel tapping system applied to the technique of traditional hand resin-tapping and film distillation of the oleoresin on the harvesting site, in a specially equipped vehicle.

Patents U.S. Pat. No. 3,959,925 and U.S. Pat. No. 4,291,492 disclose tractors possessing complex mechanized jointed-arm systems for making incisions in the bark of trees and applying an activator, but according to A. W. Hodges & W. D. Shoup (Naval Stores Review, 1988, July/August, pp. 13–19), their profitability is low, being directly connected to the firmness and flatness of the ground and their cost is high.

Many patents disclose systems for activating the secretion of the oleoresin, generally employing sulphuric acid, as noted by Prof. G. Stephan in Naval Stores Review, 1990, November/December, p. 13. To take one example, patent FR 2,160,742 discloses a solution containing sulphuric acid and a lignosulphonate.

BRIEF SUMMARY OF THE INVENTION

The object of the invention is to devise a collecting method that will make it possible to bring about the greatest possible outflow of product from the secretory channels of the tree.

It is also an object of the invention to devise a collecting method that makes it possible to limit the work on the tree, enabling each person to operate on the greatest possible number of trees per unit time, during the preparation of the tree by making an incision in the bark and for harvesting the product, while avoiding the current practice of removing bark at the start of the season and harvesting the barras resin at the end of the season.

It is also an object of the invention to devise a method of collecting the greatest possible amount of expressed oleoresin in as pure a state as possible in order to obviate the need for subsequent processing, the cost of which is prohibitive.

For this purpose the resin must be protected, as it emerges from the surface of the tree, from rubbish (bits of bark, branches, insects, etc.) and from rainwater which would carry away the tannins present in pine bark.

Similarly, the method of the invention seeks to limit the evaporative losses of the essences (terpenes) whose volatility is sufficient to greatly reduce the yield of the harvest. The method of the invention seeks furthermore to make it possible to obtain a high-quality product with limited oxidation of the oleoresin in the presence of air, water and ultraviolet light emitted by the sun.

The subject of the invention is therefore a method of collecting products secreted by trees, particularly for pine resin or oleoresin produced by coniferous trees, the method comprising the following steps: making an incision in the tree trunk of sufficient depth to reach the surface of the wood; applying to the incision a product to activate the outflow of the product to be tapped; placing in the incision a receptacle of corresponding shape, in the lower outer part of which is an outflow tube; characterized in that it also consists in fixing to the outflow tube of the receptacle a collecting bag made of a plastic that is resistant to the product collected; removing the bag when filled with product and closing it; storing the closed bags in a container and closing the container when filled with bags; transporting the closed container to a product recovery site; treating the bags contained in a container in order to clean their exterior soiled in the course of the product collecting operation; opening the cleaned bags; and recovering the product which they contain.

The invention also relates to a product collecting bag for carrying out the method according to the technique defined above, characterized in that it comprises a fixing means that fits the shape of the end of the outflow tube of the receptacle.

The invention also relates to an apparatus for making incisions in the trunk of a tree for carrying out the collecting method according to the technique defined above, characterized in that it comprises a frame with means for fixing it temporarily to the bark of the trunk and manual means for holding the frame fixed to the trunk, a rotary cutting tool that can be displaced at least axially on the frame and, mounted on the frame, a drive motor for rotating the cutting tool.

BRIEF DESCRIPTION OF THE DRAWINGS

A clearer understanding of the invention will be gained from the following description, given purely by way of example with reference to the accompanying drawings, in which.

DETAILED DESCRIPTION OF THE INVENTION

Figure 1:
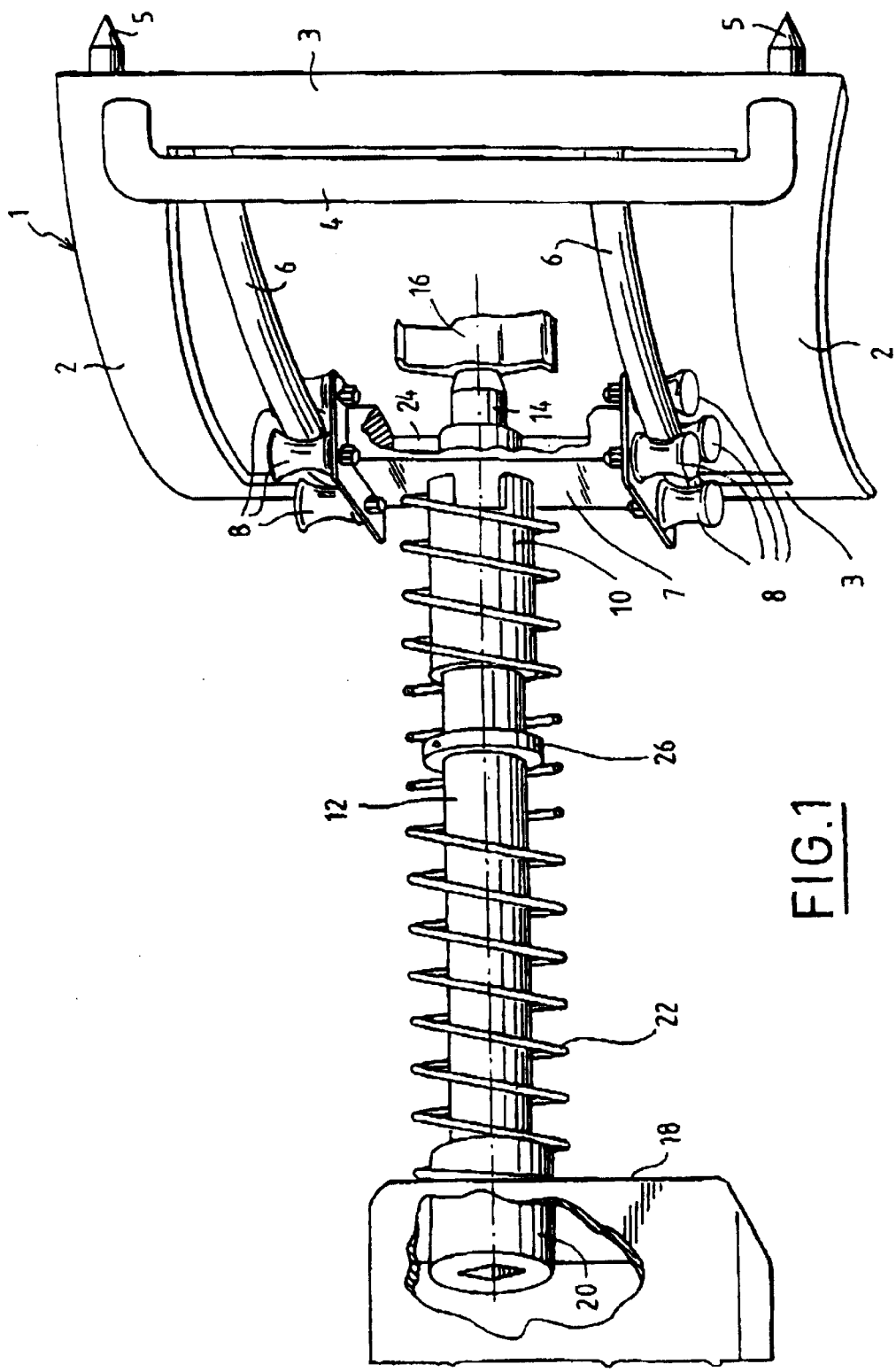
FIG. 1 is a perspective view of an apparatus for making incisions in a tree trunk, according to the invention.

FIG. 1 is a perspective view of an apparatus for making incisions in a tree trunk. It comprises a frame I in the general form of an open rectangle comprising two curved sides 2 for adapting to the curvature of tree trunks. They are consequently intended to be placed roughly horizontally.

The other two sides 3 of the frame 1 are straight and each has a handle 4 for holding the frame against the trunk in question.

The frame is provided with means for fixing it temporarily to the bark of the tree trunk in the present example these means are conical spikes 5 arranged at the four corners of the frame.

The taper of the spikes 5 is such as to allow them to be pushed relatively easily into the back of the trunk and to allow the frame to be held in place while allowing the apparatus to be withdrawn without any particular effort.

In other embodiments the frame may also be made square, triangular or of a rounded, concave shape as in FIG. 1, or flat.

The number of fixing means may be other than four.

An arrangement with three conical spikes arranged at 120° relative to the centre of the frame may be advantageous.

The material of the frame is selected for sturdiness and low weight. For example, the frame may be made from light alloy or steel.

In the space bounded by the open rectangle of the frame there are tubular rails 6 whose slope relative to the curved sides 2 of the frame is dependent on the orientation of the incision to be made in the trunk. The rails 6 also have a curvature corresponding to that of the curved sides 2.

Moving on the rails 6 is a carriage 7 at each end of which are two trains of grooved wheels 8, which grip a corresponding rail 6 and thus keep the carriage on the rails and enable it to move along them.

A tubular column support 10 is mounted on the carriage 7 and contains a sliding column 12. A drive shaft 14 rotates inside the column 12 and at its end nearest the frame it carries a cutting tool 16 consisting of a router bit which will be described in greater detail with reference to FIGS. 2 and 3.

At the end furthest from the frame 1, the column 12 carries a casing 18 for a drive motor (not shown).

The end of the shaft 14 that enters the casing 18 is fitted with a coupling member 20 for coupling it to the output shaft of the drive motor.

This motor may be an electric motor or a heat engine.

In a variant, the heat engine may be separate from the apparatus and connected to it by a flexible drive.

Between the frame 1 and the casing 18 a helical spring 22 sits around the column support 10 and around the column 12 in order to return the column 12 and hence the tool 16 to the inactive position in which the latter is withdrawn inside a housing 24 provided in the carriage 7.

The column 12 advantageously carries a collar 26 of adjustable axial position forming an end stop for the penetration of the tool into the trunk of the tree.

Figure 2:
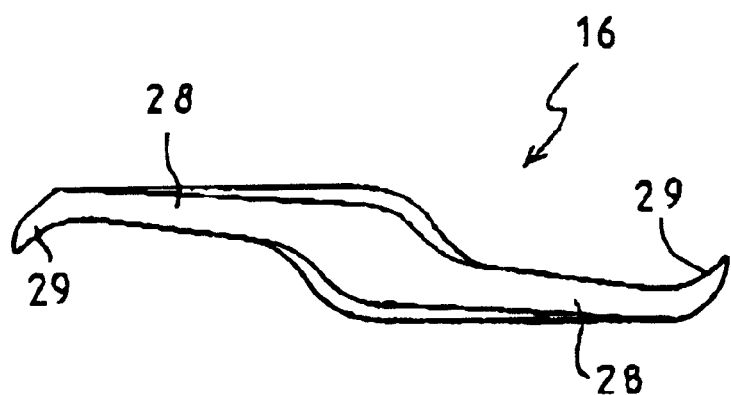
FIG. 2 is a bottom view of a router bit used in the apparatus of FIG. 1.
Figure 3:
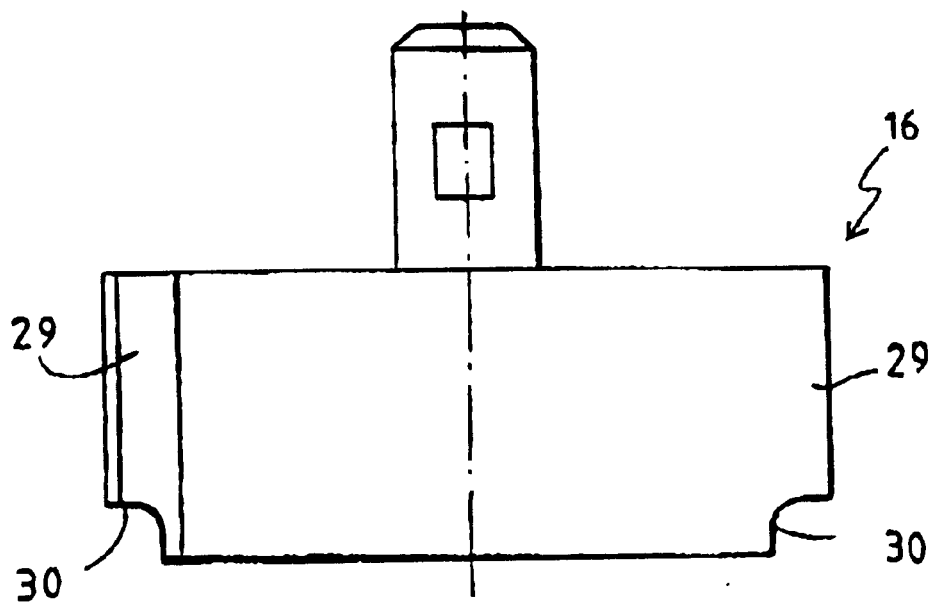
FIG. 3 is a side view of the router bit of FIG. 2.

Referring now to FIGS. 2 and 3, the router bit 16 can be seen to be a bit with two diametrically opposite teeth 28 with cutting edges 29 curved in the direction of rotation of the bit and having cutouts 30 at their lower end as clearly shown in FIG. 3. The cutouts 30 are designed to leave a rim of inner bark or of bark around the edge of the bottom of the incision.

The resulting profile of the bit gives an incision with an appropriate bottom and evacuates loose bark chips when making the incision.

The tool described above with reference to FIGS. 1 to 3 makes it possible to prepare a tree trunk with either a circular incision whose diameter corresponds to that of the router bit 16, or an elongate incision whose width corresponds to the diameter of the bit 16 and whose length is determined by the travel of the carriage 7 along its guide rails 6.

It is also possible to move obliquely relative to the curvature of the frame in order to vary the depth of the incision.

Figure 4:
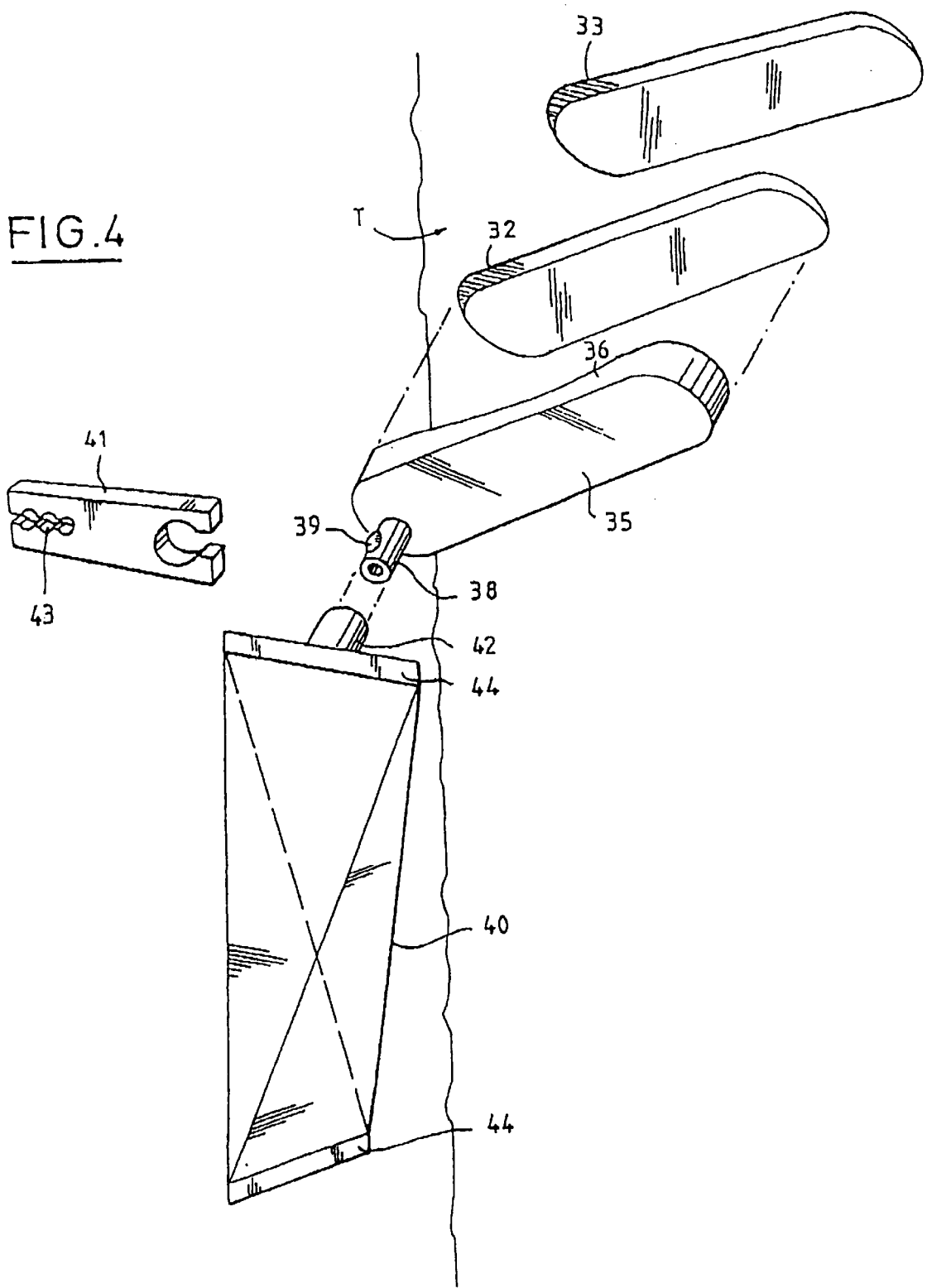
FIG. 4 is an exploded perspective view of a first embodiment of resin-collecting means according to the invention.

Two elongate incisions of the kind indicated above ire shown in FIG. 4, which is an exploded view of the various components of the collecting device by which the method of the invention is implemented.

The incisions 32, 33 are made in a trunk T with the apparatus shown in FIG. 1 after fixing the apparatus to the trunk with the aid of its conical spikes 5, and engaging the rotating bit 16 in the bark of the trunk by axial movement of the column 12 counter to the action of the return spring 22, followed by movement of the carriage 7 along the curved rails 6 fox a distance corresponding to the desired incision length.

A collecting receptacle 35 whose shape corresponds to that of the incision 32 is placed in the incision after it has been sprayed with a product that will activate the outflow (i.e., a flow activation agent).

The receptacle 35 is pushed into the incision 32 by hand or preferably with a mallet until it meets the inner bark.

The collecting receptacle is made of a plastic material resistant to resin, e.g. polypropylene, whether translucent or opaque, or any appropriate metal such as zinc.

It has an edge 36 which fits the curvature of the trunk and corresponds to the curvature selected for the shape of the frame 1 of the apparatus of FIG. 1.

In one particular embodiment the receptacle, if made of plastic, is made by injection molding.

By its shape or with the aid of a metal piece (not shown) which is added to it, it forms a seal around the outflowing resin.

The receptacle 36 is produced from a flow at a low melting point of standard polypropylene, such as RD 369P from the company Borxalls.

The material has been chosen to satisfy the most important properties for the application envisaged, such as its flexural modulus, hardness, durability and transparency.

An ultraviolet stabilizer such as Civrasorb 9441 from the company Ciba has been added in order to extend the life of the receptacles in sunlight.

In the outer part of the receptacle 36 where it is intended to be engaged in the lower part of the incision 32 is an outflow tube 38 made of the same material as the receptacle and integral with it. The tube, which is of appropriate dimensions, e.g. from 5 to 30 mm in diameter and a few centimetres long, allows the resin to flow out freely under gravity.

A plastic collecting bag 40 is fixed to the tube 38, which in the present example has an enlargement 39 molded integrally with the tube.

The bag 40 has a rigid and piece 42 welded to the bag with a recess (not shown) to accommodate the enlargement 39 on the outflow tube 38.

The bag is made of a material suitable for the product collected.

It is in a form permitting a good outflow of the product collected, for example a sachet form or a gusseted form.

It is advantageously closed at both ends by sealed lines such as 44.

Figure 5:
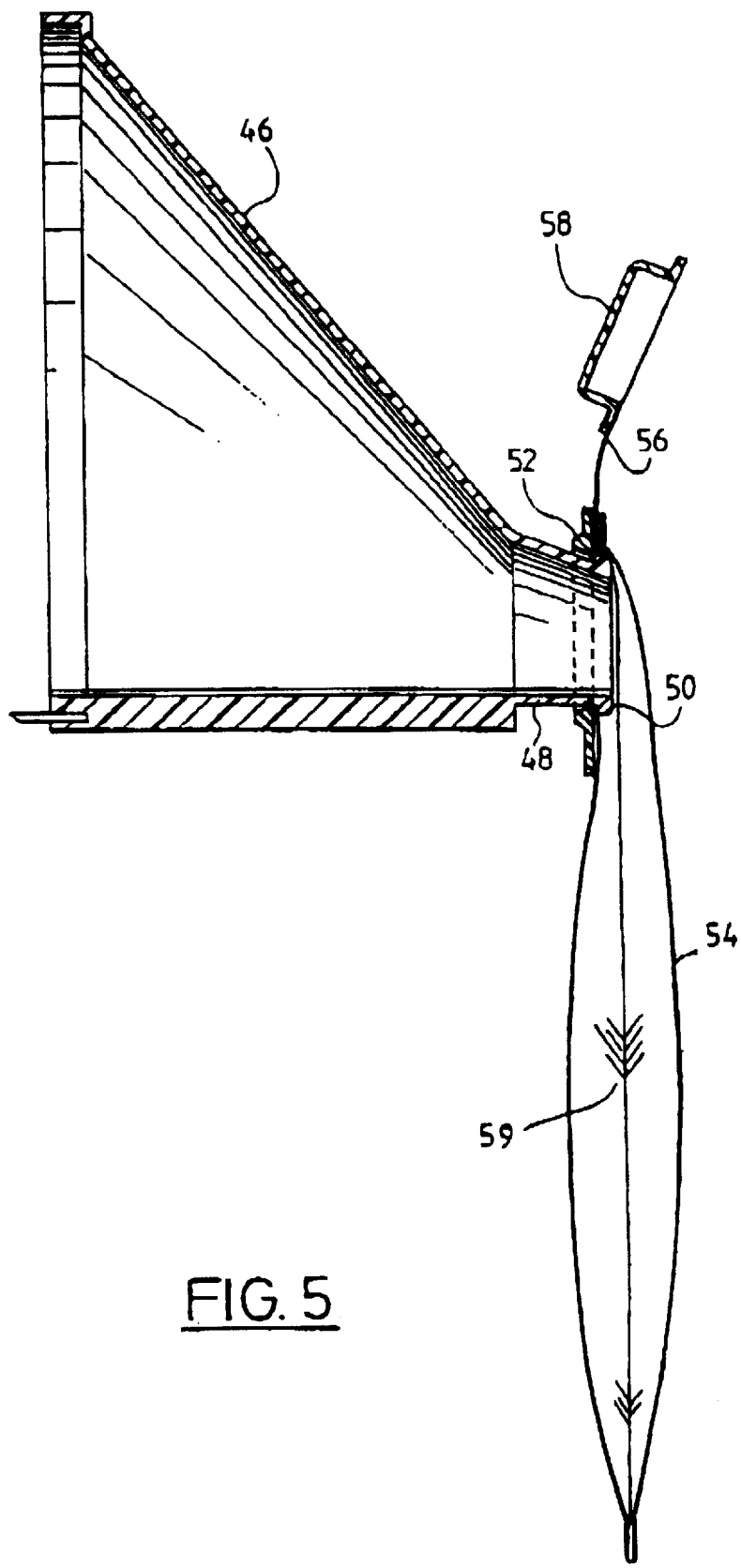
FIG. 5 is a side view in section of a second embodiment of the resin-collecting means according to the invention.

The embodiment shown in FIG. 5 comprises a receptacle 46 in the form of an injection-molded funnel with a circular footprint which can be produced with the aid of the apparatus of FIG. 1 without displacing the tool along the tracks 6 of the frame or by a similar apparatus without means of moving the tool around the trunk.

This receptacle comprises an outflow tube 48 on whose free end is a small annular enlargement 50 for retaining a rigid ring 52 welded to a collecting bag 54, to which a cap 58 is connected by a flexible tag 56 for closing the collecting bag when full and removing it from the outflow tube 48.

The bag is a advantageously made of polypropylene.

It has gussets such as the gusset 59 on each side.

The fixing of the bag to the outflow tube can be done using any fixing means comprising a rigid piece 41 one end of which clips onto the bag 40 placed on the outflow tube 38, while the other end forms a member 43 for closing the bag when the bag is full and withdrawn from the receptacle.

The bag 54 advantageously initially has no orifice inside the rigid ring 52. It is fitted to the outflow tube 48 of the outflow receptacle 46 by perforating it.

The bag used according to the invention protects the resin from any external contaminant such as bits of bark, insect, air and water, because of the fact that the oleoresin is being recovered in a closed system.

The method of collection according to the invention is carried out as follows.

First of all, the tree is prepared.

In order to reduce the amount of movement around the forest, it is envisaged in this method that one, two or three incisions are made in each tree trunk at different orientations around the tree.

The incisions in accordance with the invention may be of varying shapes such as, for example, elongate, similar to those designed to take receptacles of the kind described with reference to FIG. 4, circular for taking receptacles such as that described with reference to FIG. 5, rectangular, triangular or square, and arranged horizontally, vertically or obliquely. The depth of an incision may vary linearly along its length or be of a convex or concave form or have predefined irregularities.

The method according to the invention limits the amount of time spent on the tree because there is no preparation of the tree prior to making the incision, there being no need to remove the bark.

Similarly, the step of recovering the barras, resin at the end of the season is dispensed with.

To increase the productivity of tree preparation, this operation is carried out by teams of two people, since it requires two separate successive functions to be carried out.

The first person or cutter makes the incision with the apparatus according to the invention described with reference to FIG. 1 and the second person, the installer, places the device in this incision so that the resin can be tapped with very high yield and excellent purity.

The cutter applies the easily transportable apparatus described with reference to FIG. 1 to the non-debarked tree at a height of between 0 and 200 cm from the ground.

The slope of the guide rails 6 of the carriage 7 relative to the frame 1 enables the incision to be given the desired shape and orientation.

The profile of the router bit 16 has its own function of determining the shape of the bottom of the incision and of evacuating the bark.

As indicated earlier, the frame is fixed temporarily to the trunk of the tree by pushing its conical spikes 5 into the tree bark. These spikes keep the apparatus fixed to the tree trunk and permit relatively easy withdrawal of the apparatus after the incision has been made.

Once the frame 1 is placed against the trunk, it is held in position by the handles 4. The motor is then started and drives the shaft 14 on which the router bit 16 is mounted so that the latter rotates, and the column 12 is displaced relative to the frame 1 so that the bit 16 enters the bark of the trunk and produces an incision of circular cross section. The movement of the carriage 7 carrying the tool along the guide rails 6 of the frame 1 produces an incision of selected shape, e.g. elongate, such as the elongate incisions 32 and 33 shown in FIG. 4.

If necessary, an oblique movement relative to the plane of the frame makes it possible to vary the selected depth of the incision.

When the operation of making an incision is finished, the return spring 22 moves the column 12 and consequently the router bit 16 translationally relative to the frame and at the end of the stroke the bit 16 is retracted into the housing 24 provided in the carriage 7.

The depth of the incision ti dependent on each tree, the router bit 16 cutting into the inner bark but stopping when it meets the wood.

The diameter drilled out by the bit is from 2 to 10 cm and may advantageously be between 3 and 8 cm.

The curvature of the frame, that is to say the curvature of its curved sides 2, has a radius of from 15 to 40 cm so as to fit the varied shapes and diameters of the tree trunks.

By means of the arrangement of the invention, the tool 16 makes a cut of constant depth relative to the bark along the entire length of the travel of the tool along the guide rails 6 of the carriage 7.

The rapid rotation of the bit 16 and its particular profile ensure efficient evacuation of the bark chips removed by the bit as it forms the incision.

The result of all this is a clean incision of a selected and highly precise form, done in a very short time of less than 10 seconds, preferably lest than 8 seconds.

The apparatus described with reference to FIG. 1 is characterized by its low weight, its small size, its fast operation, the accuracy and repeatability of the shape of the incisions produced, and its simplicity.

Furthermore, the apparatus is ergonomic.

By virtue of the shape of the router bit 16 described in detail with reference to FIGS. 2 and 3, a neat and tidy cut is made in the resin-secreting channels, thus ensuring an easy outflow of the oleoresin.

This advantage can only be maintained over time by applying to the incision, e.g. by spraying, a product that prevents crystallization of the resin and does not harm the tissues of the tree.

The installer applies this product to the top cut of the incision, this being the area that produces the most resin, and with a view to further incisions which will be made above the earlier incisions.

The installer immediately closes the opening of the incision with a receptacle such as the receptacle shown in FIG. 4 or that shown in FIG. 5 depending on the shape of the incision, using the apparatus shown in FIG. 1.

As indicated above, the receptacle 35 or 46, depending on its shape, is driven in by hand or preferably with a mallet until it meets the wood.

Once the receptacle is in place, a collecting bag 40 (in the case of the embodiment of FIG. 4) or a bag 54 (in the case of the embodiment of FIG. 5) is fixed to it, the bag being fixed to the corresponding outflow tube 38, 48 and secured to this outflow tube by the means described with reference to FIGS. 4 and 5.

As can be seen, with the arrangement of the invention, the application of the resin recovery system is simple and rapid, and takes the same amount of time as is required to produce the incision.

According to the method of the invention, the cutter and the installer work at the same rate, thus avoiding the loss of time which would detract from the profitability of the resin collection process.

The work of the team is repeated three or four times in the course of the season, which runs from May to September, allowing an interval of about four to six weeks between each operation.

Each new incision is made above the previous one, leaving a gap of from 2 to 10 centimetres. This gap must correspond to the height necessary for the limit of action of the activator of the previous incision to appear on the wood.

Two harvests are carried out in the course of the season, one after the second incision and the other after the last.

The bags are easily removed from the receptacles by simply pulling them off by hand.

Each of these bags is immediately closed for example as regards the bag 54 of the embodiment shown in FIG. 5 by its cap 58, or alternatively using a clip 41 in the case of the embodiment shown in FIG. 4.

Thus closed, the bags are stored in fully open drums (hot shown). When a drum is full it is closed with a lid held by a hoop and taken away to a resin recovery site.

Bags collected in accordance with the method of the invention are sprayed or placed in a bath or steam-treated to clean their exterior, which will have become soiled during their period on the trees such as pines.

When cleaned, the bags can be opened for recovery of the resin.

Resin that stays on the bags is recovered by separating the oleoresin from the walls of the bag by warming them to between 50° C. and 90° C., and preferably between 60° C. and 80° C., the bags being hung open.

The plastic material selected for the bags is recyclable and, as indicated earlier, this material is advantageously polypropylene.

The resin recovered by the method of the invention is ready to be used industrially.

The harvesting of the resin according to the invention leaves behind no plastic or metal that will be harmful to the industrial use of the pine. In the method according to the invention all that is left on the tree is a vertical series of marks over an area of no more than 40 cm×15 cm, this limiting the impact of the operation on the quality of the wood.

EXAMPLE 1

An experiment to harvest resin from pinus pinaster trees was performed with an apparatus in which the steel frame is of rectangular shape, of dimensions 25×35 cm, fitted with two handles (FIG. 1). This frame is concave and its radius of curvature is about 30 cm, corresponding to the average size of the pine trees studied.

The face in contact with the tree bears spikes of different lengths ranging from 2 to 7 cm, of conical shape, and all parallel with each other.

Two tracks 6 reproducing the shape of the frame allow controlled movement of a mechanical tool consisting of the router bit 16 turned by an electric motor (not shown). The diameter of the bit is 40 mm and its shape is such that after having removed the bark, it is able to skid over the wood without biting into it. The bit 16 can be moved at right angles to this frame by pushing the tool column 12 towards the tree.

The return spring 22 returns the bit to it initial position when the pressure is removed.

The total weight of the apparatus is 6 kg. The supply to the electric motor is provided by batteries worn on the belt or by an electricity generating set on an individual off-road vehicle used for moving around the forest.

The apparatus was able to make incisions of identical form for each tree (FIG. 4) when a 4-cm diameter router bit was displaced over a distance of 9 cm. This displacement follows a slope of approximately 10° to the horizontal.

The incision is simultaneously cleaned by the rotation of the tool 16. When the cutter has finished this work, the installer sprays on an activator, i.e. a secretion flow activation agent, of at least equal performance to that of the SICAGEM described in patent FR 2,160,742.

The installer then sets in position a polypropylene receptacle that exactly reproduces the shape of the incision and the curvature of the incision bottom. The receptacle used is translucent and has a pipe at its lower end (FIG. 4). A high-density polypropylene bag in the form of a sachet such as the bag 40 is then fixed to the receptacle by a clip system. This bag can hold up to 1.5 litres and is 20 cm wide by 30 cm from top to bottom.

In this way the team prepared 300 trees per day on average.

A first bag is harvested and closed after the end of the production of the second incision of the season, and a second bag at the end of the season on the last incision.

The bags are collected in fully-open 220-litre coated drums. Between 1 and 2.5 litres of resin are harvested per tree.

The full drums are closed and taken away to the resin processing centre.

The closed bags are steam-cleaned and then cut open automatically so that they can be emptied by hanging them over collecting containers. The operation is performed in an enclosure heated to 60° C. in order to recover all of the resin. The resin collected contains 70% rosin and 30 turpentine.

EXAMPLE 2

Identical to Example 1 but this time the incision-making apparatus is driven by a heat engine carried on the back of the user in an appropriate harness and connected to the column of the router bit by a flexible drive system (not shown). The weight of the engine is 3 kg, and that of the frame fitted with the bit is 4.5 kg.

EXAMPLE 3

Identical to Example 1 but this time the motor of the apparatus of FIG. 1 is a heat engine.

EXAMPLE 4

Identical to Example 3 but this time the frame of the apparatus is triangular, the sides being 45 cm in length.

EXAMPLE 5

Identical to Example 1 but this time the frame is circular and has a diameter of 20 cm. The shape of the incision is circular with a diameter of 8 cm, and the router bit has a diameter of between 4 and 8 cm.

The shape of the receptacle is identical to that of the incision (FIG. 5).

EXAMPLE 6

Identical to Example 1 but this time the incision is triangular with sides 9 cm long.

EXAMPLE 7

Identical to Example 1 but this time the bag is rectangular and gusseted.

In the example given below, the method of the invention will be carried out using the collecting means described with reference to FIG. 5, set in position on a circular incision made for example using an apparatus shown in FIG. 6.

EXAMPLE 8

Figure 6:
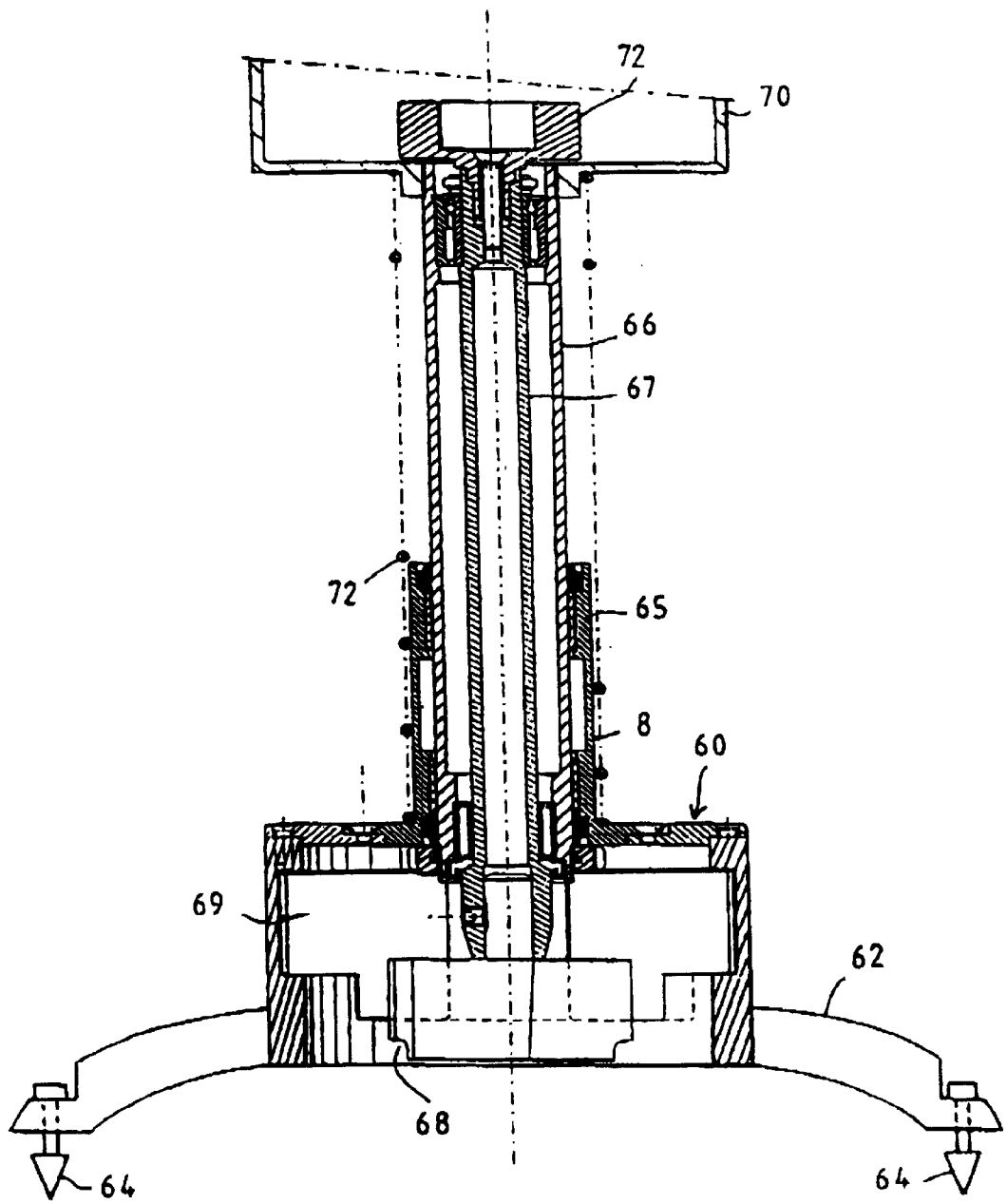
FIG. 6 is a sectional view of another embodiment of an apparatus for making incisions according to the invention.

A circular incision is made with the apparatus shown in FIG. 6.

This apparatus comprises a frame 60 in the form of a bell with two diametrically opposite curved arms 62 at its open end that extend symmetrically with respect to the bell 60 and have conical spikes 64 with which to fix the apparatus by driving them into the bark of a trunk.

The bell 60 has a tubular axial extension 65 inside which a column 66 is able to move axially. Inside the column 66 is a rotary shaft 67, the end of which inside the bell 60 carries a router bit 68 of the type described with reference to FIGS. 2 and 3.

At the other end, away from the bell 60, the column 66 supports a casing 70 for a heat engine (not shown) as a drive means.

Between the casing 70 and the bell 60, a helical return spring 72 surrounds the column and has the same function as the spring 22 of the apparatus seen in FIG. 1.

The bell 60 protects the router bit 68 when the latter is retracted into the inactive position inside the bell and it is perforated with openings 69 for the ejection of chips and dust.

It can be seen therefore that, as in the apparatus described with reference to FIG. 1, the router bit 68 rotated by the heat engine mounted in the casing 70, via the shaft 67, which for this purpose is provided with a coupling member 72 where it enters the casing 70, can likewise be moved axially with the column 66 counter to the action of the return spring 72 in order to come into contact with the bark of the trunk and produce a circular incision in the bark.

The incision it makes has a diameter of approximately 8 cm.

What is claimed is:

1. A method of collecting products secreted by a tree having wood surrounded by bark, said method comprising:

making a predetermined shaped incision in a tree, the incision having a sufficient depth to reach the surface of the wood;

applying a secretion flow activation agent to the incision;

placing a receptacle in the incision, the receptacle having a shape corresponding to the predetermined shape of the incision, the receptacle having a lower outer part fitted with an outflow tube;

fixing a collecting bag to the outflow tube, the collecting bag having outer walls and being made of a plastic that is resistant to the products;

removing the collecting bag when the collecting bag is filled with the products and closing the collecting bag via a closing device;

storing the closed collecting bag in a container arranged to receive a plurality of collecting bags and closing the container when the container is filled with a desired number of collecting bags;

transporting the closed container to a product recovery site;

treating the collecting bag contained in the container to clean the outer walls soiled during a period when the collecting bag is fixed to the outflow tube;

opening the cleaned collecting bag; and recovering the products contained in the cleaned collecting bag.

2. A method according to claim 1, wherein said placing of the receptacle in the incision comprises pushing the receptacle into the incision until the receptacle meets the wood.

3. A method according to claim 1, wherein the product is resin, and wherein the collecting bag comprises polypropylene.

4. A method according to claim 1, wherein the collecting bag comprises a perforation, and wherein said fixing of the collecting bag onto the outflow tube comprises fitting of the outflow tube through the perforation.

5. A method according to claim 1, wherein said recovering of the products comprises hanging open the cleaned collecting bag and heating the cleaned collecting bag to a temperature between 50° C. and 90° C.

6. A method according to claim 5, wherein said heating of the cleaned collecting bag comprises heating the collecting bag to a temperature between 60° C. and 80° C.

7. A method according to claim 1, further comprising adding an ultraviolet stabilizer to the receptacle prior to said placing of the receptacle in the incision.

8. The collecting bag for carrying out the method according to claim 1, wherein the collecting bag comprises a fixing device for fixing the collecting bag to the outflow tube, and wherein the fixing device fits the shape of the outflow tube.

9. The collecting bag according to claim 8, wherein fixing device comprises a rigid ring welded to the collecting bag, the rigid ring having a recess, and wherein a cap is connected to the collecting bag via a flexible tag.

10. The collecting bag according to claim 8, wherein the fixing device comprises a detachable rigid piece having a first end shaped to enable the fixing device to clip onto the collecting bag when the collecting bag is on the outflow tube and a second end shaped to enable the fixing device to close the collecting bag when the collecting bag is removed from the outflow tube.

11. The collecting bag according to claim 8, wherein the collecting bag comprises a material suitable for the products, and wherein the collecting bag comprises two sealed ends.

12. The collecting bag according to claim 8, wherein the collecting bag comprises a shape that permits outflow of the products from the collecting bag.

13. The collecting bag according to claim 12, wherein the shape of the collecting bag is selected from a group consisting of a sachet and a gusset.

14. A method of collecting products secreted by a tree having wood surrounded by bark, said method comprising:

making a predetermined shaped incision through the bark to the surface of the wood;

applying a secretion flow activation agent to the incision;

placing a receptacle in the incision, the receptacle comprising a lower outer portion and an outflow tube located at the lower outer portion, the outflow tube having a first end disposed close to the incision and a second end, the outflow tube having a first opening located at the first end and a second opening located at the second end, a portion of the receptacle having the same shape as the predetermined shape of the incision;

fixing an opening of a collecting apparatus having an outer surface to the second opening of the outflow tube, the collecting apparatus comprising a fixing device for fixing the collecting apparatus to the outflow tube, the fixing device having a shape adapted to fit the shape of the outflow tube;

removing the collecting apparatus from the outflow tube when the collecting apparatus is filled with the products;

closing the collecting apparatus;

storing the closed collecting apparatus in a container;

closing the container;

transporting the container to a product recovery site;

treating the closed collecting apparatus to clean the outer surface thereof;

opening the cleaned collecting apparatus; and recovering the products from the cleaned collecting apparatus.

15. The method of claim 14, wherein the fixing device comprises a rigid ring welded to the collecting apparatus, the rigid ring having a recess, and wherein a cap is connected to the collecting apparatus via a flexible tag.

16. The method of claim 14, wherein the fixing device comprises a detachable rigid piece having a first end shaped to enable the fixing device to clip onto the collecting apparatus when the collecting apparatus is on the outflow tube and a second end shaped to enable the fixing device to close the collecting apparatus when the collecting apparatus is removed from the outflow tube.

17. The method of claim 14, wherein the collecting apparatus comprises a resin resistant material.

18. The method of claim 14, wherein the collecting apparatus comprises a shape selected from the group consisting of a sachet shape and a gusseted shape.

19. A method of collecting products secreted from a tree having wood surrounded by bark, said method comprising:

making a predetermined shaped incision through the bark to the surface of the wood;

applying a secretion flow activation agent to the incision;

placing a receptacle in the incision, the receptacle comprising a lower outer portion and an outflow tube located at the lower outer portion, the outflow tube having a first end disposed close to the incision and a second end, the outflow tube having a first opening located at the first end and a second opening located at the second end, a portion of the receptacle having the same shape as the predetermined shape of the incision;

fixing an opening of a collecting apparatus having an outer surface to the second opening of the outflow tube;

removing the collecting apparatus from the outflow tube when the collecting apparatus is filled with the products;

closing the collecting apparatus;

storing the closed collecting apparatus in a container;

closing the container;

transporting the container to a product recovery site;

treating the closed collecting apparatus to clean the outer surface thereof;

opening the cleaned collecting apparatus; and recovering the products from the cleaned collecting apparatus.

20. The method of claim 19, wherein said placing the receptacle in the incision comprises pushing the receptacle into the incision until the receptacle meets the wood.

21. The method of claim 19, wherein the secretion is resin, and wherein the collecting apparatus comprises polypropylene.

22. The method of claim 19, wherein the collecting apparatus comprises a perforation, and wherein said fixing of the collecting apparatus onto the outflow tube comprises fitting of the outflow tube through the perforation.

23. The method of claim 19, wherein said recovering of the products comprises hanging open the cleaned collecting apparatus and heating the cleaned collecting apparatus to a temperature between 50° C. and 90° C.

24. The method of claim 23, wherein said heating of the cleaned collecting apparatus comprises heating the cleaned collecting apparatus to a temperature between 60° C. and 80° C.

25. The method of claim 19, further comprising adding an ultraviolet stabilizer to the receptacle prior to said placing of the receptacle in the incision.

* * * * *